(12) United States Patent
Park

(10) Patent No.: US 7,760,885 B2
(45) Date of Patent: Jul. 20, 2010

(54) METHOD OF DISTRIBUTING ENCRYPTION KEYS AMONG NODES IN MOBILE AD HOC NETWORK AND NETWORK DEVICE USING THE SAME

(75) Inventor: Kyung-bae Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 759 days.

(21) Appl. No.: 10/845,195

(22) Filed: May 14, 2004

(65) Prior Publication Data

US 2004/0228492 A1 Nov. 18, 2004

(30) Foreign Application Priority Data

May 16, 2003 (KR) ............... 10-2003-0031308

(51) Int. Cl.
*H04L 9/08* (2006.01)
(52) U.S. Cl. ............... 380/283; 380/278; 380/285
(58) Field of Classification Search ........... 380/278, 380/282, 277, 283, 284, 285, 260; 713/168, 713/169, 171
See application file for complete search history.

(56) References Cited

U.S. PATENT DOCUMENTS

| | | | |
|---|---|---|---|
| 4,578,531 A * | 3/1986 | Everhart et al. ............. | 380/282 |
| 5,241,599 A | 8/1993 | Bellovin et al. | |
| 5,784,463 A | 7/1998 | Chen et al. | |
| 6,178,506 B1 | 1/2001 | Quick, Jr. | |
| 6,226,383 B1 | 5/2001 | Jablon | |
| 6,944,762 B1 * | 9/2005 | Garrison ............... | 713/160 |

| | | |
|---|---|---|
| 2001/0001876 A1 | 5/2001 | Morgan et al. |

FOREIGN PATENT DOCUMENTS

| | | |
|---|---|---|
| EP | 1 248 408 A2 | 10/2002 |
| JP | 10-22992 A | 1/1998 |
| JP | 10-257064 | 9/1998 |
| JP | 2001-345795 A | 12/2001 |
| JP | 2002026899 | 1/2002 |
| JP | 2002-529013 | 9/2002 |
| JP | 2003506972 | 2/2003 |
| KR | 2001-0008102 A | 2/2001 |

OTHER PUBLICATIONS

Rescorla, RFC #2631: Diffie-Hellman Key Agreement Method, Jun. 1999, pp. 1-13 Downloaded from, http://www.ietf.org/rfc/rfc2631.txt, on Oct. 11, 2007.*
Fan Lei et al:, Deniable authentication protocol based on Deffie-Hellman algorithm:, Electronics Letters, IEE Stevenage, GB, pp. 705-706, XP006018512.
Chinese Office Action dated Jan. 19, 2007.

* cited by examiner

*Primary Examiner*—Kimyen Vu
*Assistant Examiner*—Edward Zee
(74) *Attorney, Agent, or Firm*—Sughrue Mion, PLLC

(57) ABSTRACT

A method of distributing encryption keys among nodes in a mobile ad hoc network, and a network device using the same. In particular, a method of distributing encryption keys, which guarantees the security of a ciphertext in the mobile ad hoc network. The method of distributing the encryption keys among nodes including a first node and a second node in the mobile ad hoc network include creating a private key and a public key based on a first encryption method by the first node; if the first node transmits the created public key to Node B, creating predetermined parameters operable to create a common key according to a second encryption method by the second node.

11 Claims, 6 Drawing Sheets

● Mobile Node
— Transitory Link

METHOD OF DISTRIBUTING ENCRYPTION KEYS AMONG NODES IN MOBILE AD HOC NETWORK AND NETWORK DEVICE USING THE SAME

This application claims the priority of Korean Patent Application No. 10-2003-0031308 filed on May 16, 2003 in the Korean Intellectual Property Office, the disclosure of which is incorporated herein by reference.

BACKGROUND OF THE INVENTION

1. Field of the Invention

The present invention relates to a method of distributing encryption keys among nodes in a mobile ad hoc network, and a network device using the same. More particularly, the present invention relates to a method of distributing encryption keys among nodes in a mobile ad hoc network, and a network device using the same, wherein stable and reliable encryption key distribution between two nodes can be achieved by using predetermined first and second encryption methods in the mobile ad hoc network without an authentication server or key distribution center (KDC) and by transmitting/receiving predetermined parameters for creating a common key according to the second encryption method.

2. Description of the Related Art

Recently, as information communication networks have developed, a variety of information is exchanged via wireless/wired communication networks.

The most commonly used data encryption method between two terminals, including wireless/wired communication networks, is a public key/private key-based data encryption method.

In addition, there is the Diffie-Hellman data encryption method utilizing the Diffie-Hellman key distribution protocol, and an encryption method utilizing a combination of the public/private key-based data encryption method and the Diffie-Hellman data encryption method.

The public key/private key-based data encryption method is also called a public key encryption method and is illustrated in FIG. 1a.

As shown in FIG. 1a, the operation of an authentication and encryption system based on the public key encryption method includes the process of registering public keys KUa and KUb created at each node into a key distribution center, the process of retrieving, by one node, a public key from the other node from the key distribution center in order to perform authentication and encryption between the respective nodes, and the process of sending encrypted data using the other node's public key obtained from the key distribution center.

That is, node A creates a public and private key (KUa, Pa) and Node B creates a public and private key (KUb, Pb) according to the public key encryption method (hereinafter, simply referred to as "public key" and "private key"), and the nodes send the public key KUa or KUb to the key distribution center so that the public key can be registered therein.

As an example, if Node A intends to communicate with Node B, Node A requests that the key distribution center send Node B's public key KUb in order to transmit authentication information for user authentication to Node B.

When the requested Node B's public key KUb has been received from the key distribution center, the authentication information is encrypted with the public key KUb to create a ciphertext $E_{KUb}$ which in turn is sent to Node B.

Node B decrypts the received ciphertext $E_{KUb}$ with its own private key Pb. The decrypted authentication information of Node A is then used for performing user authentication.

As another example, if Node A, which has been authenticated through the user authentication procedure, intends to transmit a predetermined message as a ciphertext to Node B, Node A encrypts the message by using Node B's public key KUb received from the key distribution center and then sends the resultant ciphertext $E_{KUb}$ to Node B.

Node B receives the ciphertext $E_{KUb}$, decrypts the received ciphertext $E_{KUb}$ with Node B's private key Pb and then processes the message obtained through decryption.

The Diffie-Hellman encryption method performs encryption by using a common key Z (not shown) created with the Diffie-Hellman key distribution protocol, which is illustrated in FIG. 1b.

As shown in FIG. 1b, the operation of an authentication and encryption system based on the Diffie-Hellman encryption method is performed on the assumption that both Nodes A and B know global public elements q and α.

Node A creates a private and public key (Xa, Ya) and Node B creates a private and public key (Xb, Yb) according to the Diffie-Hellman encryption method (hereinafter, simply referred to as "Diffie-Hellman private key" and "Diffie-Hellman public key"). Then, Nodes A and B exchange the respective created Diffie-Hellman public keys Ya and Yb with each other.

Then, a common key Z used for encryption is created using the Diffie-Hellman private key of one node and a Diffie-Hellman public key of the other node. Any encrypted ciphertext can be decrypted using each node's own Diffie-Hellman private key.

FIG. 1c illustrates a combination of the public key encryption method and the Diffie-Hellman encryption method.

That is, public keys KUa and KUb provided by Nodes A and B, which have created their own private keys Pa and Pb, are registered with the key distribution center. Then, Nodes A and B create Diffie-Hellman private keys Xa and Xb and Diffie-Hellman public keys Ya and Yb.

Then, Node A encrypts the Diffie-Hellman public key Ya by using Node B's public key KUb provided from the key distribution center and sends the encrypted Diffie-Hellman public key $E_{KUb}(Ya)$ to Node B, while Node B encrypts the Diffie-Hellman public key Yb by using Node A's public key KUa provided from the key distribution center and then sends the encrypted Diffie-Hellman public key $E_{KUa}(Yb)$ to Node A.

Each node which receives the Diffie-Hellman public key $E_{KUb}(Ya)$ or ($E_{KUa}(Yb)$) encrypted with either public key KUa or KUb decrypts the received public key by using its own Diffie-Hellman private key Xa or Xb, and creates a Diffie-Hellman common key Z (not shown) (hereinafter, simply referred to as "Diffie-Hellman common key") from the use of the decrypted public key Ya or Yb. The Diffie-Hellman common key can be used to authenticate a user and to encrypt message information.

However, the use of the key distribution center in the various encryption methods described above cannot be employed in a mobile ad hoc network (hereinafter, abbreviated to "MANET") which is a collection of wireless mobile hosts forming a temporary network without the aid of any centralized administration or standard support services.

As shown in FIG. 2, since the MANET is independently configured without depending on an existing infrastructure such as the Internet, topology and link status of the network varies with the movement of each mobile node. Thus, the MANET is not provided with a fixed control device for providing connections to a backbone host or any other mobile hosts.

Accordingly, there cannot exist a key distribution center capable of registering a public key received from each mobile node or providing a relevant public key according to requests from a mobile node.

In the MANET, the Diffie-Hellman encryption method that creates a common key by combining the private keys of one node and a public key of another node has been widely used.

However, since the Diffie-Hellman encryption method creates a Diffie-Hellman private key and a Diffie-Hellman public key by using predetermined equations with logarithmic characteristics, there is a problem in that the created keys can be easily exposed to unauthorized or malicious parties.

Namely, if a malicious user knowing global public elements q and α used in the Diffie-Hellman encryption method acquires the Diffie-Hellman public keys Ya and Yb of Nodes A and B, the user can obtain the Diffie-Hellman private keys Xa and Xb of Nodes A and B by using the acquired public keys.

Thus, since the malicious user decrypts and interprets a ciphertext being received/transmitted between Nodes A and B, there is a problem in that the Diffie-Hellman key distribution and encryption method itself cannot guarantee security of the ciphertext received/transmitted between Nodes A and B.

Therefore, there is a need for a method of distributing encryption keys, which guarantees security of a ciphertext in the MANET.

SUMMARY OF THE INVENTION

A primary aspect of the present invention is to provide a method of distributing encryption keys, which guarantees security of a ciphertext in a mobile ad hoc network.

Another aspect of the present invention is to guarantee the stability of information received/transmitted between two nodes in a mobile ad hoc network.

A further aspect of the present invention is to enable creation of encryption keys by using a Diffie-Hellman encryption method, without assuming that each node knows global public elements.

The present invention enables the stable creation of a common key for encryption by using first and second encryption methods in encryption key distribution between two nodes in a mobile ad hoc network and by transmitting/receiving predetermined parameters used for creating the common key based on the second encryption method.

The predetermined parameters used for creating the common key based on the second encryption method comprises a public key based on the first encryption method, global public elements based on the second encryption method, and a public key based on the second encryption method.

Consistent with one aspect of the present invention, there is provided a method of distributing encryption keys among nodes in a mobile ad hoc network, comprising creating a private key and a public key based on a first encryption method by a first node; transmitting, by the first node, the created public key to a second node and receiving a ciphertext transmitted from the second node and decrypting the received ciphertext by using the private key of the first node; and creating, by the first node, a private key and a public key based on a second encryption method by using the decrypted ciphertext, encrypting the public key based on the second encryption method with the public key based on the first encryption method, and then transmitting the encrypted public key to the second node.

Consistent with another aspect of the present invention, there is provided a method of distributing encryption keys among nodes in a mobile ad hoc network, comprising if a second node receives a public key of a first node based on a first encryption method from the first node, creating predetermined parameters for creating a common key according to a second encryption method by the second node; encrypting, by the second node, the created, predetermined parameters with the received public key of the first node and transmitting the encrypted parameters to the first node; and receiving a ciphertext transmitted from the first node and decrypting the received ciphertext by using the private key of the second node.

Consistent with a further aspect of the present invention, there is provided a method of distributing encryption keys among nodes in a mobile ad hoc network, comprising creating a private key and a public key based on a first encryption method by a first node; if the first node transmits the created public key based on the first encryption method to a second node, creating predetermined parameters for creating a common key according to a second encryption method by the second node; if the second node encrypts the created, predetermined parameters with the public key based on the first encryption method and transmits the encrypted parameters as a ciphertext to the first node, decrypting the received ciphertext by using the private key of the first node by the first node; creating, by the first node, a private key and a public key based on a second encryption method by using the decrypted ciphertext, encrypting the created public key based on the second encryption method and transmitting the encrypted public key as a ciphertext to the second node; and receiving, by the second node, the ciphertext transmitted from the first node and decrypting the received ciphertext by using the private key of the second node.

Consistent with a still further aspect of the present invention, there is provided a network device, comprising an encryption unit for transmitting its own public key based on a first encryption method to a second node in a mobile ad hoc network, decrypting a ciphertext transmitted from the second node by using its own private key and creating a private key and a public key based on a second encryption method by using the decrypted ciphertext, and encrypting the public key based on the second encryption method by using the public key based on the first encryption method and transmitting the encrypted public key to the second node; and an information storage unit for storing information required or created for performing encryption and decryption through the encryption unit.

Consistent with a still further aspect of the present invention, there is provided a network device, comprising an encryption unit for creating predetermined parameters for use in creating a common key according to a second encryption method when a public key based on a first encryption method is received from a first node in a mobile ad hoc network, encrypting the created parameters with the public key based on the first encryption method, transmitting the encrypted parameters to the first node, and decrypting a ciphertext transmitted from the first node by using its own private key; and an information storage unit for storing information required or created for performing encryption and decryption through the encryption unit.

In an exemplary embodiment of the present invention, the network device further comprises a transmitting/receiving unit for enabling the transmission/reception of information through a communication link connected to a specific node in the mobile ad hoc network, and an application driving unit for controlling the operation of providing applications according to information obtained through a decryption procedure performed in the encryption unit.

BRIEF DESCRIPTION OF THE DRAWINGS

The above and other aspects, features and advantages of the present invention will become apparent from the following description of an exemplary embodiment given in conjunction with the accompanying drawings, in which.

DETAILED DESCRIPTION OF THE INVENTION

Hereinafter, a method of distributing encryption keys among nodes in a mobile ad hoc network, and a network device using the same consistent with the present invention will be described in detail with reference to the accompanying drawings.

In explaining the configurations and operations of the method of distributing the encryption keys among the nodes in the mobile ad hoc network and the network device using the same with reference to the accompanying drawings, first and second encryption methods will be described as a public key encryption method and the Diffie-Hellman encryption method, respectively. However, it is for illustrative purposes only and it will be understood by those skilled in the art that various changes and other equivalents may be made to the encryption method of creating predetermined public and private keys and creating a common key for encryption.

Accordingly, the true technical scope of the present invention should be construed as being defined by the appended claims.

Figure 1A:
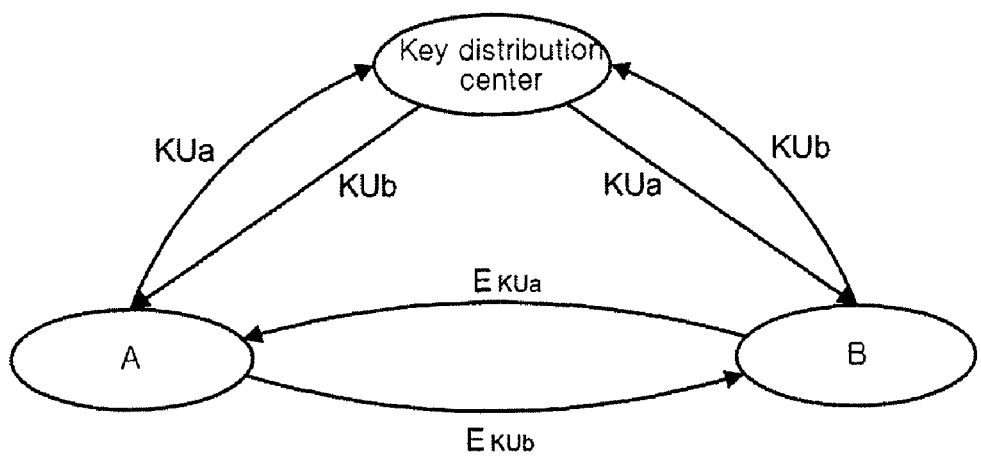
FIGS. 1a to 1c schematically show conventional encryption methods.
Figure 1B:
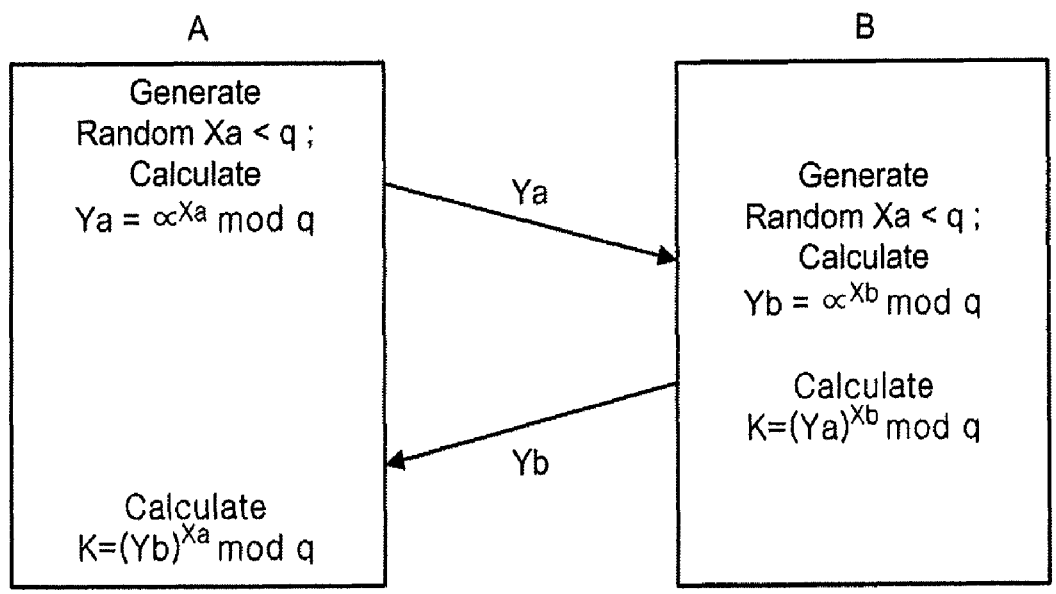
Figure 1C:
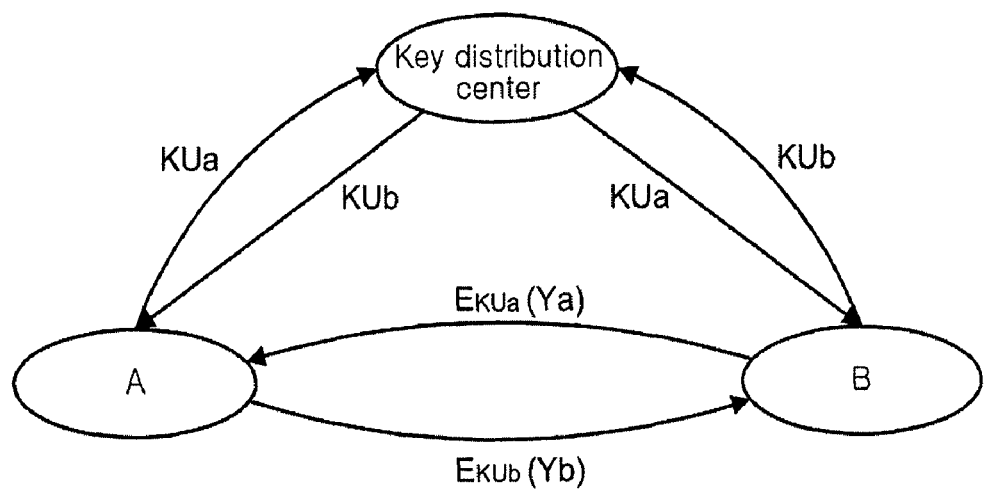
Figure 2:
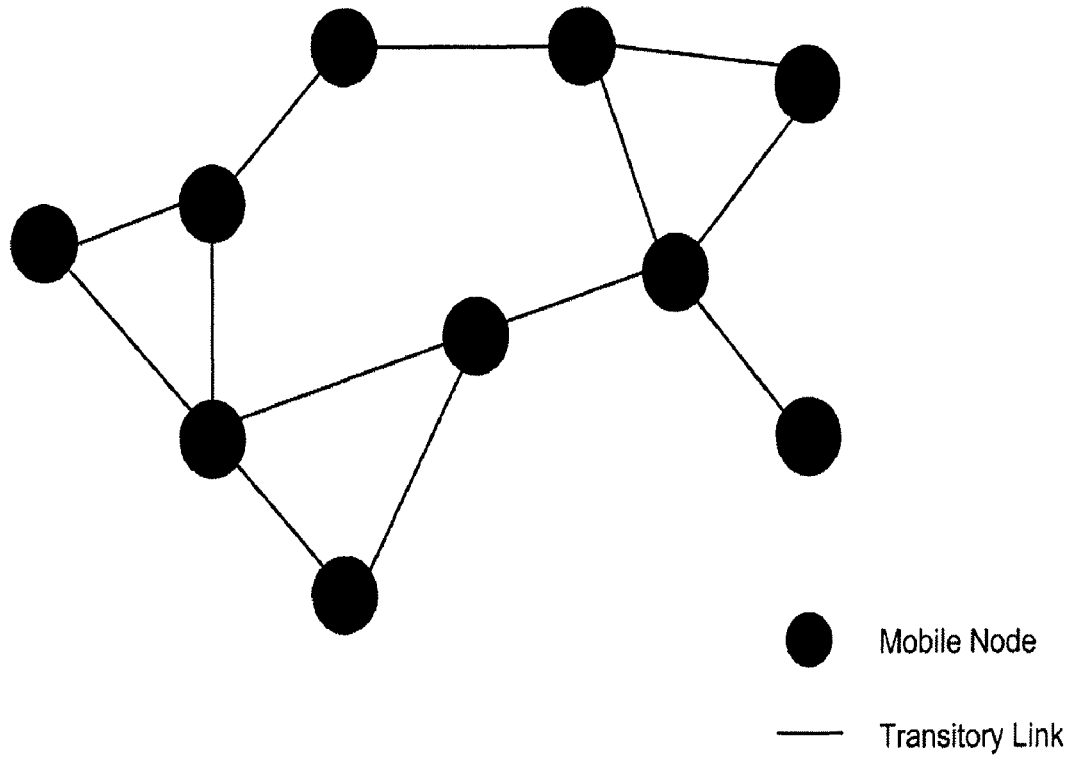
FIG. 2 schematically shows a conventional mobile ad hoc network system.
Figure 3:
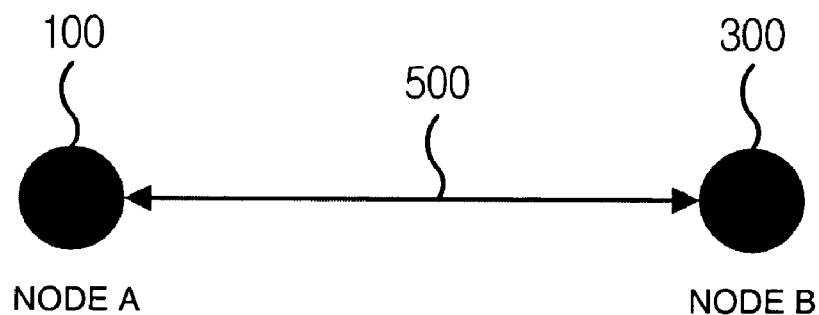
FIG. 3 schematically shows a key distribution system between nodes for encryption in a mobile ad hoc network consistent with an exemplary, non-limiting embodiment of the present invention.

FIG. 3 schematically shows a key distribution system between nodes for encryption in the mobile ad hoc network consistent with an exemplary, non-limiting embodiment of the present invention.

As shown in FIG. 3, the key distribution system consistent with the present invention comprises a user's mobile node 100 (hereinafter, referred to as "Node A") that intends to send a ciphertext to a predetermined node, a destination mobile node 300 (hereinafter, referred to as "Node B") that receives and processes information from the ciphertext sent by Node A 100, and a communication link 500 as a path for receiving and transmitting data between Node A 100 and Node B 300.

Nodes A and B are terminals existing in a communication network, which may be implemented with notebook computers, personal digital assistants (PDA), mobile phones, and the like, and are provided with network devices 10 which enable the stable creation of a common key for encryption through key distribution based on both the public key encryption method and the Diffie-Hellman encryption method.

Figure 4:
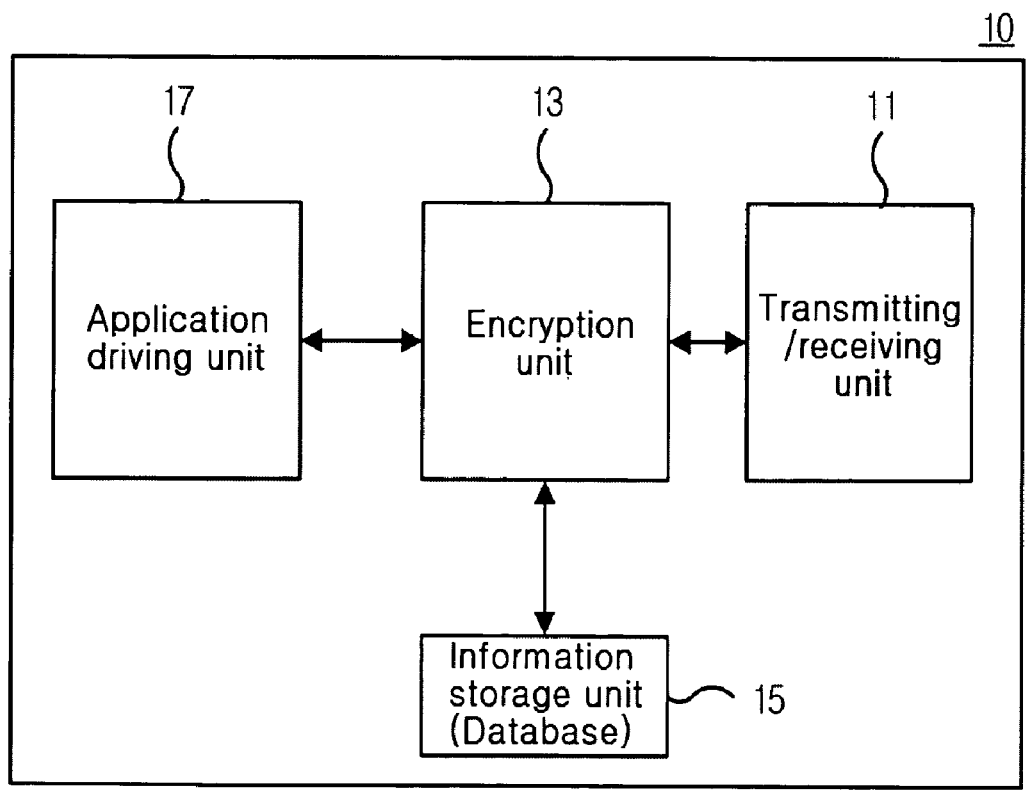
FIG. 4 schematically shows a network device consistent with an embodiment of the present invention.

FIG. 4 schematically shows the configuration of the network device 10 consistent with an embodiment of the present invention.

As shown in FIG. 4, the network device 10 comprises a transmitting/receiving unit 11 for enabling information to be transmitted/received through the communication link 500, an encryption unit 13 for controlling encryption and decryption operations needed for transmitting and receiving a ciphertext through the transmitting/receiving unit 11, an information storage unit or database 15 for storing information detected by the encryption unit 13, and an application driving unit 17 for controlling operations of providing applications based on information obtained through decryption procedures performed in the encryption unit 13.

Further, when communication with a particular node is desired, the encryption unit 13 exchanges predetermined parameters, which are needed for creating a public key and a Diffie-Hellman public key by using the public key encryption method and Diffie-Hellman encryption method, with the particular node and then performs encryption key distribution so as to stably create a Diffie-Hellman common key.

The predetermined parameters used for creating the Diffie-Hellman common key include global public elements q and a, a public key, and a Diffie-Hellman public key.

As an example, if Node A 100 transmits its own public key to Node B 300 for the purpose of attempting encryption key distribution, Node B 300 creates the predetermined parameters for use in creating the Diffie-Hellman common key based on Node A's received public key, encrypts the parameters with Node A's received public key, and then transmits the encrypted parameters as a ciphertext to Node A 100.

Node A 100 decrypts the received ciphertext with its own private key, detects the global public elements and creates the Diffie-Hellman private key and Diffie-Hellman public key by using the detected global public elements. Then, Node A 100 encrypts its own Diffie-Hellman public key thus created with Node B's public key and then sends the encrypted Diffie-Hellman public key to Node B 300.

Consistent with the present invention, one of Node A 100 and Node B 300 has the Diffie-Hellman public key of the respective other node that has been exchanged with the respective other node. A common key is created with the exchanged public keys.

For reference, all or some of the respective modules of the network device consistent with the aforementioned embodiment of the present invention may be implemented with hardware or software.

Therefore, it will be apparent that the implementation of the network device consistent with the present invention with hardware or software falls within the scope of the present invention and further modifications and variations may be made thereto without departing from the scope of the invention.

Next, the method of distributing the encryption keys among the nodes in the mobile ad hoc network using the network device constructed as above will be described in detail with reference to the accompanying drawings.

The method of distributing the encryption keys among the nodes in the mobile ad hoc network consistent with the present invention comprises attempting, by Node A 100 that commences ciphertext transmission, key distribution for encryption, transmitting Node A's public key to Node B 300, and creating a common key, based on predetermined parameters which Node B 300 sends to Node A in response to the attempted key distribution, and creating, by Node B 300, the predetermined parameters for use in creating the Diffie-Hellman common key when Node A 100 attempts key distribution, transmitting the created parameters to Node A 100, and creating the common key with Node A's Diffie-Hellman public key received from Node A.

In explaining the aforementioned method of the present invention, procedures performed in Node A that attempts the key distribution for encryption will be first described, and procedures performed in Node B in response to the key distribution attempted by Node A 100 will be then described.

Figure 5:
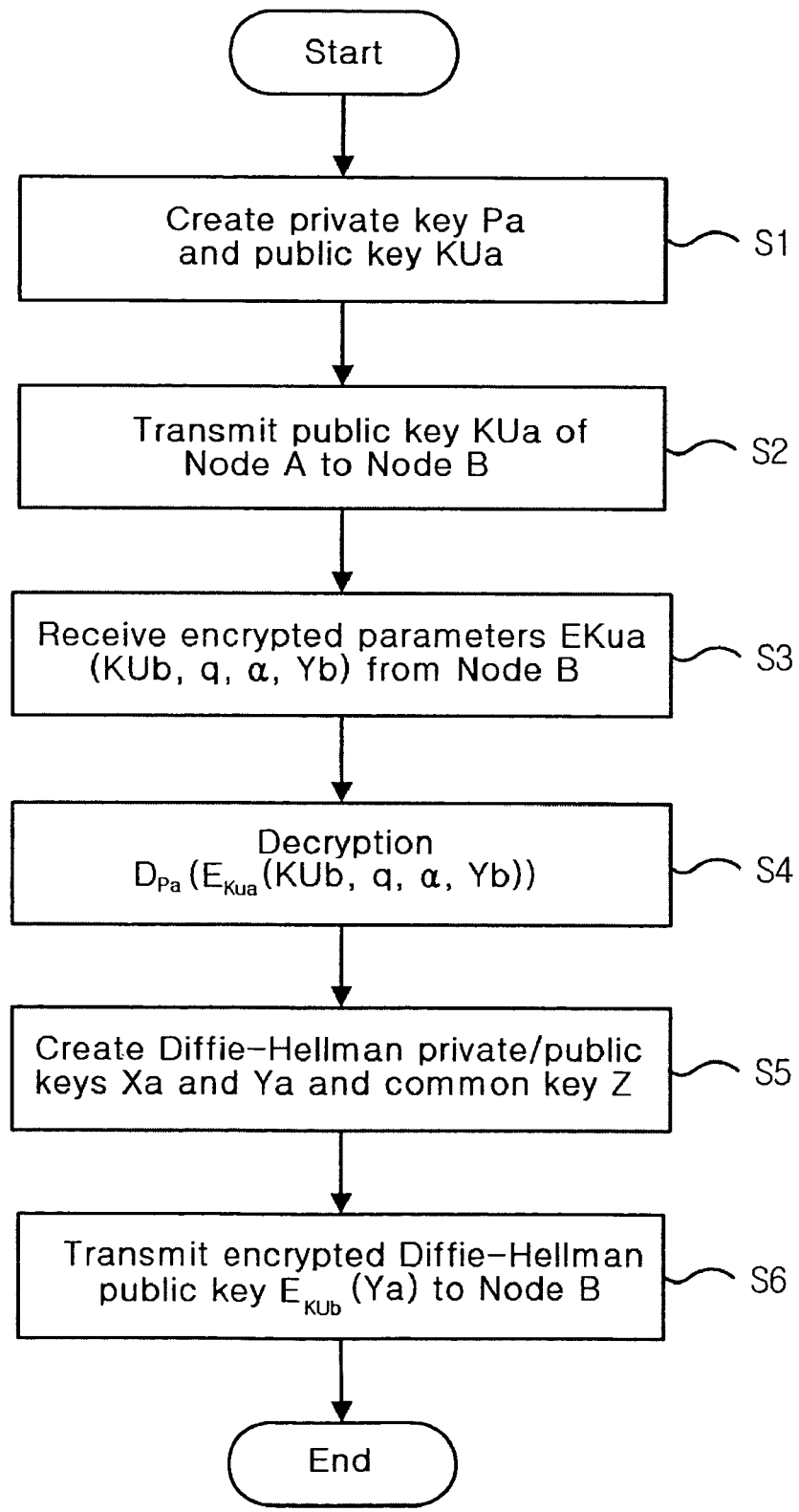
FIG. 5 is a flowchart illustrating procedures for operations performed in a node that attempts to distribute encryption keys consistent with an embodiment of the present invention.

FIG. 5 is a flowchart illustrating the procedures performed in a node that attempts key distribution for encryption consistent with an embodiment of the present invention.

As shown in FIG. 5, Node A 100 that attempts the key distribution creates a private key Pa and a public key KUa by the public key encryption method (S1).

Then, the public key KUa thus created is transmitted to Node B upon attempting the key distribution for encryption (S2). Node A 100 receives a ciphertext $E_{Kua}$ (KUb, q, α, Yb) transmitted from Node B 300 in response thereto (S3).

Since the received ciphertext has been encrypted with Node A's 100 public key, Node A 100 performs decryption $D_{pa}$ ($E_{Kua}$ (KUb, q, α, Yb)) for the received ciphertext by using its own private key Pa (S4).

Through the above decryption procedure, Node A 100 can obtain the global public elements q and α, Node B's Diffie-Hellman public key Yb and Node B's public key KUb, which are required according to the Diffie-Hellman encryption method.

Node A 100 applies the global public elements obtained through the decryption procedure to the following Equation 1 so as to create the Diffie-Hellman private key Xa and the Diffie-Hellman public key Ya.

$$Xa (0<Xa<q)$$

$$Ya = \alpha^{Xa} \bmod q \qquad \text{Equation 1}$$

After the Diffie-Hellman private and public keys Xa and Ya are created through Equation 1, Node A 100 applies Node B's Diffie-Hellman public key Yb obtained through the aforementioned decryption procedure to the following Equation 2 so as to create a common key Z.

$$Z = Yb^{Xa} \bmod q \qquad \text{Equation 2}$$

Node A 100 creates the Diffie-Hellman private key Xa, the Diffie-Hellman public key Ya, and the Diffie-Hellman common key Z through Equations 1 and 2 (S5).

Then, Node A 100 encrypts the created Diffie-Hellman public key Ya by using Node B's public key KUb obtained from the decryption procedure and then sends a resultant ciphertext $E_{KUb}$ (Ya) to Node B 300 (S6).

Through these procedures, Node A that attempts the encryption key distribution creates its own Diffie-Hellman private and public keys by using the predetermined parameters received from Node B in response to attempt at key distribution, and transmits the created Node A's Diffie-Hellman public key to Node B 300. Consequently, the common key for encryption can be stably created.

Figure 6:
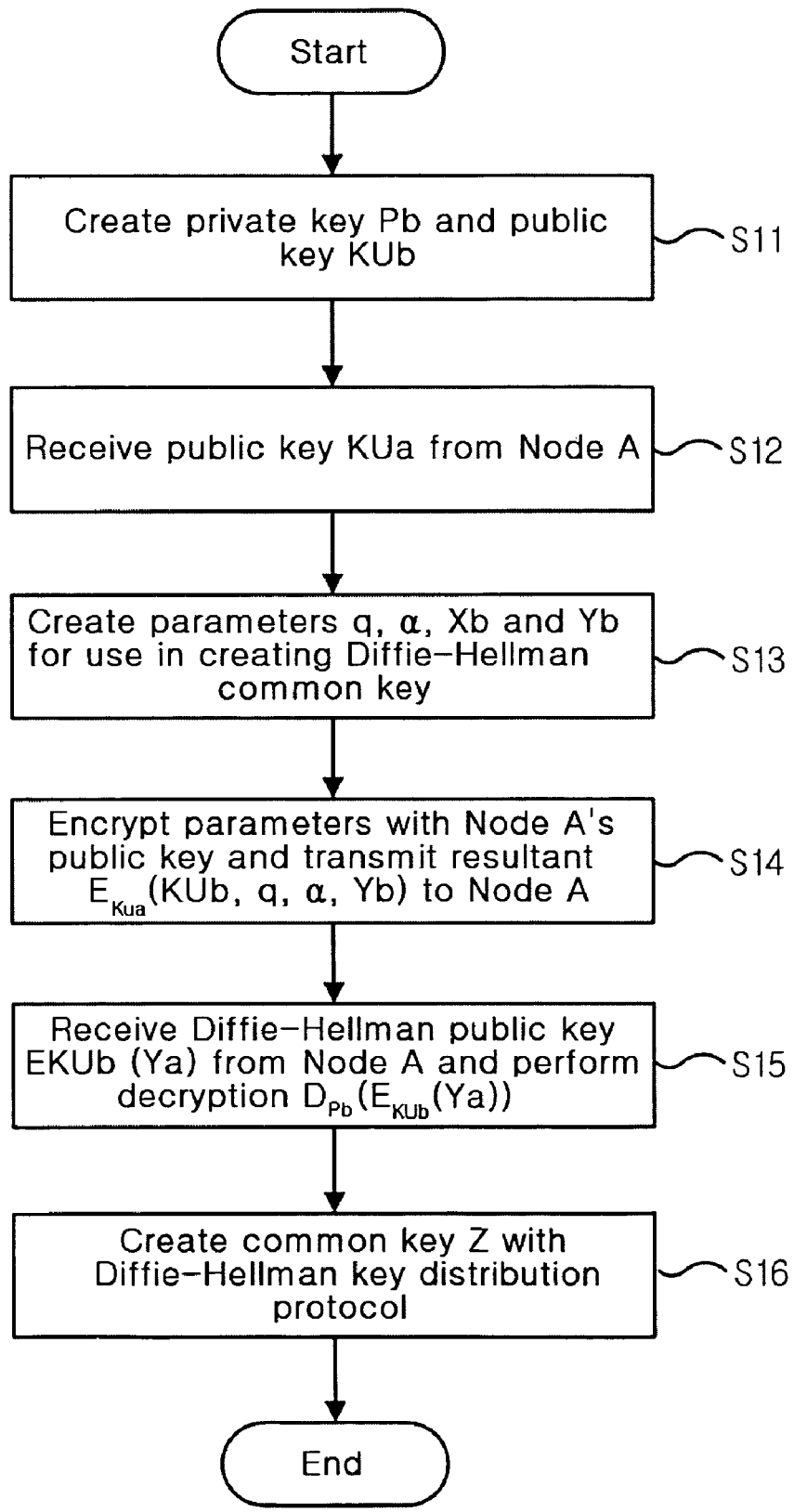
FIG. 6 is a flowchart illustrating procedures for operations performed in a node that accepts the key distribution for encryption consistent with an embodiment of the present invention.

FIG. 6 is a flowchart illustrating procedures for operations performed in the node that accepts the key distribution for encryption consistent with an embodiment of the present invention.

As shown in FIG. 6, Node B 300 first creates a private key Pb and a public key KUb by the public key encryption method (S11).

Then, when Node B 300 receives Node A's public key KUa from Node A 100 (S 12), Node B recognizes that key distribution for, encryption is being attempted and that a response thereto is being requested by Node A 100.

In response thereto, Node B 300 creates the global public elements q and α, based on the Diffie-Hellman encryption method, applies the created global public elements to Equation 1, and then creates a Diffie-Hellman private key Xb and a Diffie-Hellman public key Yb through the following Equation 3.

$$Xb: 0<Xb<q$$

$$Yb = \alpha^{Xb} \bmod q \qquad \text{Equation 3}$$

Node B creates the global public elements q and a, the Diffie-Hellman private key Xa, and the Diffie-Hellman public key Yb through Equation 3 (S13).

Then, Node B's own public key KUb as well as the global public elements q and α and the Diffie-Hellman public keys Yb are set as predetermined parameters used for creating a Diffie-Hellman common key.

Thereafter, Node B 300 encrypts the set predetermined parameters with Node A's public key KUa, and then transmits a resultant ciphertext $E_{Kua}$ (KUb, q, α, Yb) to Node A 100 (S14).

When Node B receives Node A's Diffie-Hellman public key $E_{KUb}$ (Ya) encrypted with Node B's public key KUb from Node A 100 in response to the ciphertext $E_{Kua}$ (KUb, q, α, Yb) transmitted from Node B 300, Node B performs decryption $D_{Pb}$ ($E_{KUb}$ (Ya)) in which the received Node A's Diffie-Hellman public key is decrypted by using Node B's private key Pb (S15).

Node B 300 applies Node A's Diffie-Hellman public key Ya obtained through the decryption procedure to Equation 2 and creates a Diffie-Hellman common key Z through the following Equation 4.

$$Z = Ya^{Xb} \bmod q \qquad \text{Equation 4}$$

Through these procedures, Node B 300 sends Node A 100 the predetermined parameters that have been created through the Diffie-Hellman encryption method for the encryption key distribution when Node A 100 attempts the encryption key distribution. The common key used for encryption can be stably created by using Node A's Diffie-Hellman public key transmitted from Node A 100.

Next, the method of distributing the encryption keys among the nodes in the mobile ad hoc network consistent with the present invention will be described in detail by way of example with reference to the accompanying drawing.

Figure 7:
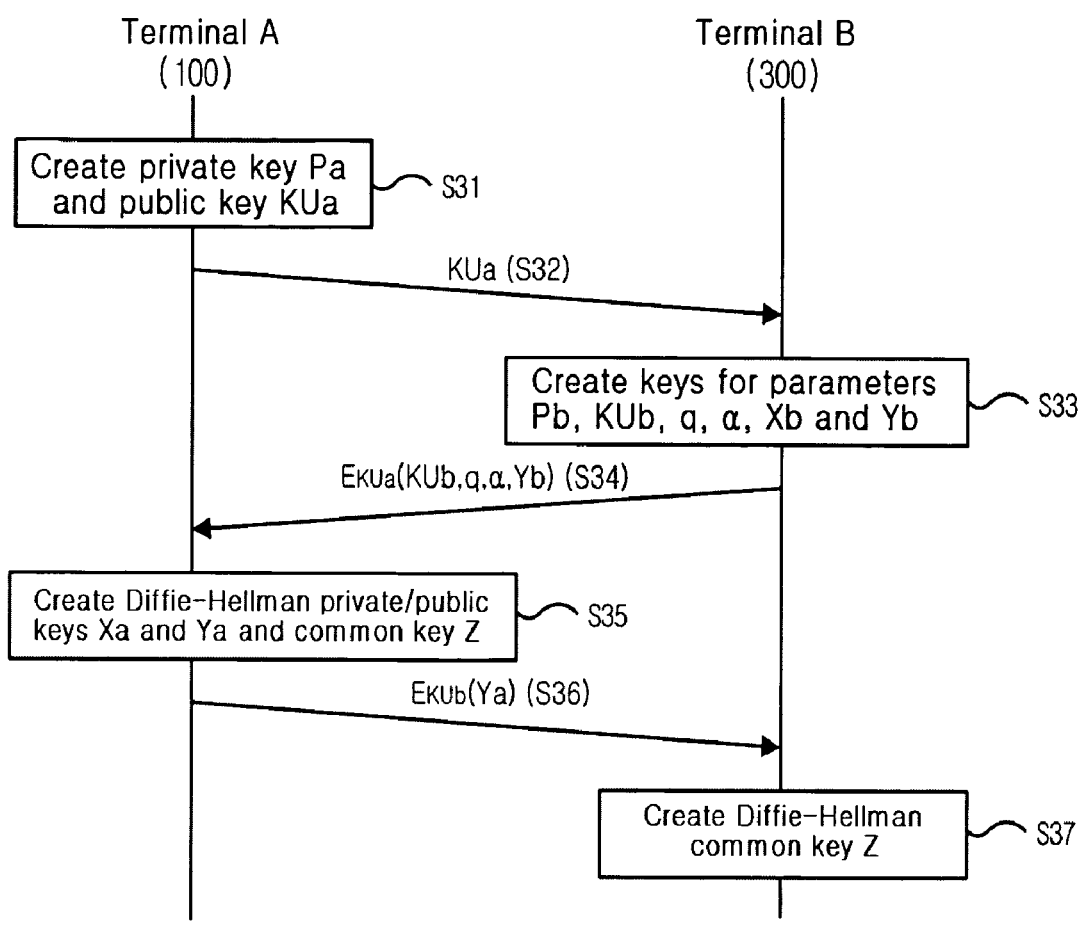
FIG. 7 schematically shows a sequence diagram illustrating communication procedures between mobile terminals consistent with an embodiment of the present invention.

FIG. 7 schematically shows a sequence diagram illustrating communication procedures between mobile terminals consistent with an embodiment of the present invention.

As shown in FIG. 7, if the user of Terminal A 100 wishes to send predetermined data to the user of Terminal B 300, Terminal A 100 encrypts the data to be sent according to the request of the user and then attempts encryption key distribution in order to stably communicate with Terminal B 300.

Terminal A 100 creates its own public key KUa and private key Pa based on the public key encryption method (S31) and transmits the created public key KUa to Terminal B 300 (S32).

At this time, Terminal B 300 recognizes, based on the public key KUa transmitted from Terminal A 100, that Terminal A 100 is attempting key distribution for encryption.

Terminal B 300 then creates its own private key Pb and public key KUb in order to respond to the encryption key distribution by Terminal A 100. To transmit the Diffie-Hellman public key, Terminal B determines the global public elements q and a by the Diffie-Hellman encryption method and creates Terminal B's own Diffie-Hellman private and public keys Xb and Yb (S33).

When the keys for encryption are created in such a way, Terminal B 300 encrypts the predetermined parameters, which includes the global public elements q and α, the Diffie-Hellman public key Yb and the public key KUb and are used for creating the Diffie-Hellman common key, with Terminal A's public key KUa received from Terminal A 100. Then, Terminal B 300 transmits the resultant ciphertext $E_{Kua}$ (KUb, q, α, Yb) to Terminal A (S34).

Upon receipt of the ciphertext $E_{Kua}$ (KUb, q, α, Yb), Terminal A decrypts the received ciphertext with its own private key Pa and then creates its own Diffie-Hellman private key Xa and public key Ya by using the global public elements q and α obtained through the decryption procedure.

Further, Terminal A creates a common key Z by using Terminal B's Diffie-Hellman public key Yb (S35).

After Terminal A 100 creates the common key Z based on the predetermined parameters transmitted from Terminal B 300, Terminal A 100 encrypts its own Diffie-Hellman public key Ya with Terminal B's public key Kub, which is obtained from the parameters transmitted from Terminal B 300, and then sends the encrypted public key to Terminal B 300 (S36).

Then, Terminal B 300 performs the decryption procedure for detecting Terminal A's received Diffie-Hellman public key Ya, which has been encrypted with Terminal B's public key KUb, and then creates the common key Z by using Terminal A's detected Diffie-Hellman public key Ya (S37).

Through these procedures, both Terminal A 100 and Terminal B 300 have the common key Z for encryption.

Even if a malicious user intends to extract the encryption key through the communication link established between the two terminals, it becomes difficult to acquire the parameters used for creating the encrypted Diffie-Hellman common key. Therefore, the common key allows the two terminals to stably encrypt and transmit data to be sent.

Consistent with the present invention, the encryption key distribution method based on the mobile ad hoc network can guarantee the security of a ciphertext transmitted and received during encrypted communication.

In addition, the present invention can guarantee the security of information transmitted and received between two nodes in the mobile ad hoc network.

Further, the present invention provides an effect enabling encryption keys to be created by using the Diffie-Hellman encryption method, without assuming that each node knows global public elements.

What is claimed is:

1. A method of distributing encryption keys among nodes in a mobile ad hoc network, comprising:
   creating a private key and a public key based on a first encryption method by a first node;
   transmitting, by the first node, the created public key to a second node and receiving parameters encrypted with the public key based on the first encryption method from the second node;
   decrypting, by the first node, the parameters by using the private key of the first node;
   creating, by the first node, a private key, a public key and a common key based on a second encryption method by using the decrypted parameters; and
   encrypting, by the first node, the public key based on the second encryption method with a public key of the second node based on the first encryption method, and then transmitting the encrypted public key to the second node;
   wherein the parameters comprise global public elements which are used in creating the private key of the first node based on the second encryption method;
   wherein the parameters comprise the public key of the second node based on the first encryption method, the global public elements, and the public key of the second node based on the second encryption method.

2. The method as claimed in claim 1, wherein the second encryption method comprises the Diffie-Hellman encryption method, and the distribution method further comprises creating a common key by using the private key of the first node based on the Diffie-Hellman encryption method and the public key of the second node created by the Diffie-Hellman encryption method through the parameters.

3. A method of distributing encryption keys among nodes in a mobile ad hoc network, comprising:
   receiving, by a second node, a public key of a first node based on a first encryption method from the first node;
   creating, by the second node, parameters which are used to create a common key according to a second encryption method;
   encrypting, by the second node, the created parameters with the received public key of the first node and transmitting the encrypted parameters to the first node; and
   receiving, by the second node, the public key of the first node based on the second encryption method which has been encrypted by the first node and decrypting the public key of the first node by using a private key of the second node based on the first encryption method;
   wherein the parameters comprise global public elements which are used in creating a private key of the first node based on the second encryption method;
   wherein the parameters comprise the public key of the second node based on the first encryption method, the global public elements, and the public key of the second node based on the second encryption method.

4. The method as claimed in claim 3, wherein the second encryption method comprises a Diffie-Hellman encryption method, and the distribution method further comprises creating the common key using the public key of the first node created by the Diffie-Hellman encryption method through decrypted parameters and the private key of the second node based on the Diffie-Hellman encryption method.

5. A method of distributing encryption keys among nodes in a mobile ad hoc network, comprising:
   creating a private key and a public key based on a first encryption method by a first node;
   if the first node transmits the created public key based on the first encryption method to a second node, creating parameters which are used to create a common key according to a second encryption method by the second node;
   if the second node encrypts the created parameters with the public key based on the first encryption method and transmits the encrypted parameters to the first node, decrypting the encrypted parameters by using the private key of the first node by the first node;
   creating, by the first node, a private key and a public key based on a second encryption method by using the decrypted parameters, encrypting the created public key based on the second encryption method and transmitting the encrypted public key to the second node; and
   receiving, by the second node, the encrypted public key transmitted from the first node and decrypting the encrypted public key by using a private key of the second node;
   wherein the second encryption method comprises the Diffie-Hellman encryption method, and
   the distribution method further comprises:

creating, by the first node, the common key by using the private key of the first node based on the Diffie-Hellman encryption method and a public key of the second node created by the Diffie-Hellman encryption method through the decrypted parameters; and creating, by the second node, the common key by using a private key of the first node created by the Diffie-Hellman encryption method through the parameters, which has been decrypted with the private key of the second node, and a private key of the second node based on the Diffie-Hellman encryption method;

wherein the parameters comprise global public elements which are used in creating the private key of the first node based on the second encryption method;

wherein the parameters comprise the public key of the second node based on the first encryption method, the global public elements, and public key of the second node based on the second encryption method.

6. A hardware network device, comprising:

an encryption unit configured to transmit a public key of a first node based on a first encryption method to a second node in a mobile ad hoc network, receive parameters encrypted with the public key of the first node based on the first encryption method from the second node, decrypt the parameters by using a private key of the first node, create a private key, a public key and a common key based on a second encryption method by using the decrypted parameters, and encrypt the public key of the first node based on the second encryption method by using a public key of the second node based on the first encryption method and transmit the encrypted public key to the second node; and an information storage unit configured to store information required or created configured to perform encryption and decryption through the encryption unit;

wherein the first encryption method comprises a public key encryption method, and when the public key of the first node based on the second encryption method is encrypted and transmitted to the second node, the public key of the first node based on the second encryption method is encrypted with a public key of the second node created by the first encryption method;

wherein the parameters comprise global public elements which are used in creating the private key of the first node based on the second encryption method;

wherein the parameters comprise the public key of the second node based on the first encryption method, the global public elements, and the public key of the second node based on the second encryption method.

7. The device as claimed in claim 6, further comprising a transmitting/receiving unit configured to enable the transmission/reception of information through a communication link connected to the first node or the second node in the mobile ad hoc network, and an application driving unit configured to control the operation of providing applications according to information obtained through a decryption procedure performed in the encryption unit.

8. The device as claimed in claim 6, wherein the second encryption method comprises the Diffie-Hellman encryption method, and a common key is created by using the private key of the first node based on the Diffie-Hellman encryption method and the public key of the second node created by the Diffie-Hellman encryption method through the parameters.

9. A hardware network device, comprising:

an encryption unit configured to create parameters used in creating a common key according to a second encryption method when a public key based on a first encryption method is received from a first node in a mobile ad hoc network, encrypt the created parameters with the public key based on the first encryption method, transmit the encrypted parameters to the first node, receive a public key of the first node based on the second encryption method which has been encrypted by the first node, and decrypt the public key of the first node by using a private key of the second node based on the first encryption method; and an information storage unit configured to store information required or created configured to perform encryption and decryption through the encryption unit;

wherein the second encryption method comprises the Diffie-Hellman encryption method, and a common key is created by using a public key of the first node created by the Diffie-Hellman encryption method through the decrypted parameters, and a private key of the first node based on the Diffie-Hellman encryption method;

wherein the parameters comprise global public elements which are used in creating the private key of the first node based on the second encryption method;

wherein the parameters comprises the public key based on the first encryption method, the global public elements, and a public key based on the second encryption method.

10. The device as claimed in claim 9, further comprising a transmitting/receiving unit configured to enable the transmission/reception of information through a communication link connected to a specific node in the mobile ad hoc network, and an application driving unit configured to control the operation of providing applications according to information obtained through a decryption procedure performed in the encryption unit.

11. The device as claimed in claim 9, wherein the first encryption method comprises a public key encryption method, and wherein the parameters are encrypted with the public key of the first node based on the first encryption method.

* * * * *